(12) United States Patent
McMillan et al.

(10) Patent No.: US 10,316,895 B2
(45) Date of Patent: Jun. 11, 2019

(54) UNIVERSAL JOINT

(71) Applicant: Ulterra Drilling Technologies, L.P., Fort Worth, TX (US)

(72) Inventors: Justin S. McMillan, Fort Worth, TX (US); Christopher M. Casad, Benbrook, TX (US); Beau J. St. Pierre, Hudson Oaks, TX (US); Carl Aron Deen, Fort Worth, TX (US)

(73) Assignee: Ulterra Drilling Technologies, L.P., Fort Worth, TX (US)

( * ) Notice: Subject to any disclaimer, the term of this patent is extended or adjusted under 35 U.S.C. 154(b) by 0 days.

(21) Appl. No.: 15/195,892

(22) Filed: Jun. 28, 2016

(65) Prior Publication Data

US 2017/0002871 A1 Jan. 5, 2017

Related U.S. Application Data

(60) Provisional application No. 62/186,899, filed on Jun. 30, 2015.

(51) Int. Cl.
*E21B 17/20* (2006.01)
*F16D 3/56* (2006.01)

(52) U.S. Cl.
CPC ............... *F16D 3/56* (2013.01); *E21B 17/20* (2013.01)

(58) Field of Classification Search
CPC ...................................................... E21B 17/20
See application file for complete search history.

(56) References Cited

U.S. PATENT DOCUMENTS

| | | | |
|---|---|---|---|
| 1,314,990 A | 9/1919 | Stockwell | |
| 1,355,516 A | 10/1920 | Rodolphe | |
| 1,362,646 A | 12/1920 | Stockwell | |
| 1,376,504 A | 5/1921 | Behn | |
| 1,479,755 A | 1/1924 | Stokes | |
| 1,488,291 A | 3/1924 | Schell | |
| 1,550,458 A | 8/1925 | Schell | |
| 2,319,027 A | 5/1943 | Aker | |
| 2,491,820 A * | 12/1949 | Leibing | F16C 1/04 464/147 |
| 2,647,380 A | 8/1953 | Henry et al. | |
| 3,497,083 A | 2/1970 | Anderson et al. | |
| 4,055,966 A | 11/1977 | Fredericks | |
| 4,233,820 A * | 11/1980 | Driver | E21B 17/20 138/120 |

(Continued)

OTHER PUBLICATIONS

Final Office Action received from the U.S. Patent and Trademark Office in U.S. Appl. No. 15/160,809, dated Aug. 30, 2017, 12 pages.

(Continued)

*Primary Examiner* — Giovanna C Wright
*Assistant Examiner* — Dany E Akakpo
(74) *Attorney, Agent, or Firm* — Kilpatrick Townsend & Stockton LLP

(57) ABSTRACT

A universal joint assembled to a drill string transfers torque and axial force between two components where the shafts of the components are not completely aligned. The universal joint includes end members connected to opposite ends of a cable for connecting to components of the drill string. As the joint rotates the cable flexes to accommodate misalignment between the connected drill string components.

9 Claims, 5 Drawing Sheets

(56) References Cited

U.S. PATENT DOCUMENTS

| | | | |
|---|---|---|---|
| 5,019,015 A | 5/1991 | Wasserfuhr | |
| 5,053,687 A | 10/1991 | Merlet | |
| 5,740,699 A | 4/1998 | Ballantyne et al. | |
| 6,155,349 A * | 12/2000 | Robertson | E21B 7/061 166/298 |
| 6,220,372 B1 * | 4/2001 | Cherry | E21B 7/061 166/117.5 |
| 6,676,526 B1 | 1/2004 | Poster | |
| 6,896,473 B2 | 5/2005 | Schuler | |
| 7,367,772 B2 | 5/2008 | Khajepour et al. | |
| 8,251,938 B1 | 8/2012 | Morcuende et al. | |
| 2014/0027185 A1 | 1/2014 | Menger et al. | |
| 2016/0341255 A1 | 11/2016 | Kummer et al. | |
| 2017/0002871 A1 | 1/2017 | McMillan et al. | |
| 2017/0023068 A1 | 1/2017 | Maw et al. | |
| 2017/0081928 A1 | 3/2017 | Maw et al. | |
| 2017/0328416 A1 | 11/2017 | Maw et al. | |
| 2017/0370420 A1 | 12/2017 | Deen et al. | |

OTHER PUBLICATIONS

International Search Report and Written Opinion received from the International Search Authority in Patent Cooperation Treaty Application No. PCT/US2015/047387, dated Dec. 10, 2015, 8 pages.
Non-Final Office Action received from the U.S. Patent and Trademark Office in U.S. Appl. No. 15/160,809, dated Dec. 14, 2016, 18 pages.
Non-Final Office Action received from the U.S. Patent and Trademark Office in U.S. Appl. No. 15/195,892, dated Oct. 6, 2017, 9 pages.
Response to Non-Final Office Action filed with the U.S. Patent and Trademark Office in U.S. Appl. No. 15/160,809, dated Jun. 14, 2017, 17 pages.

* cited by examiner

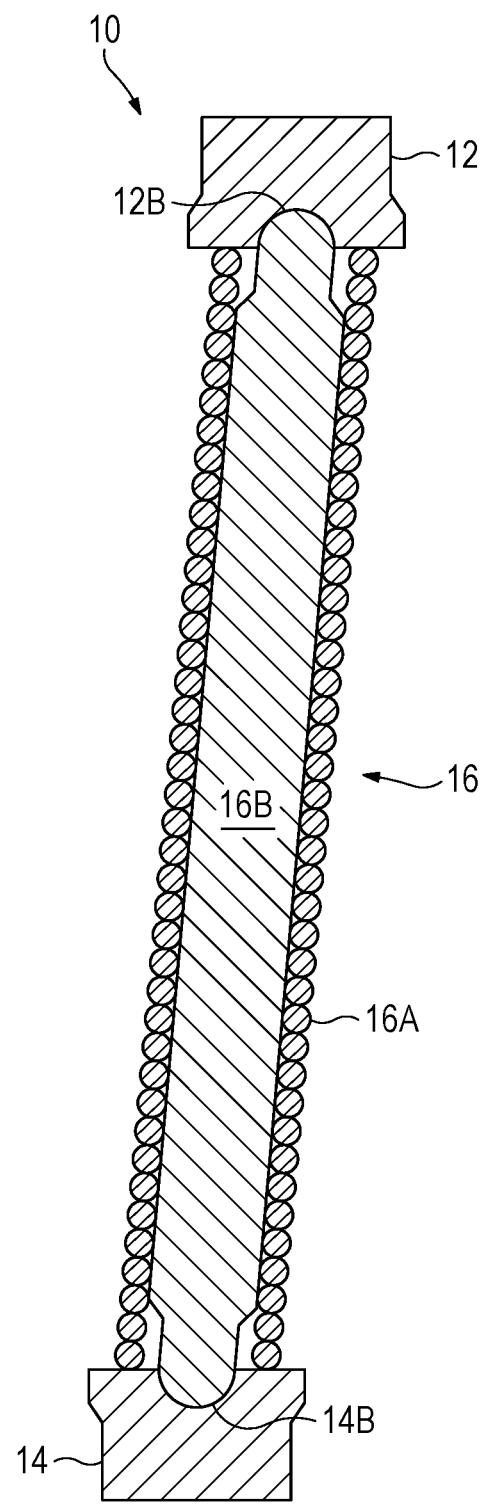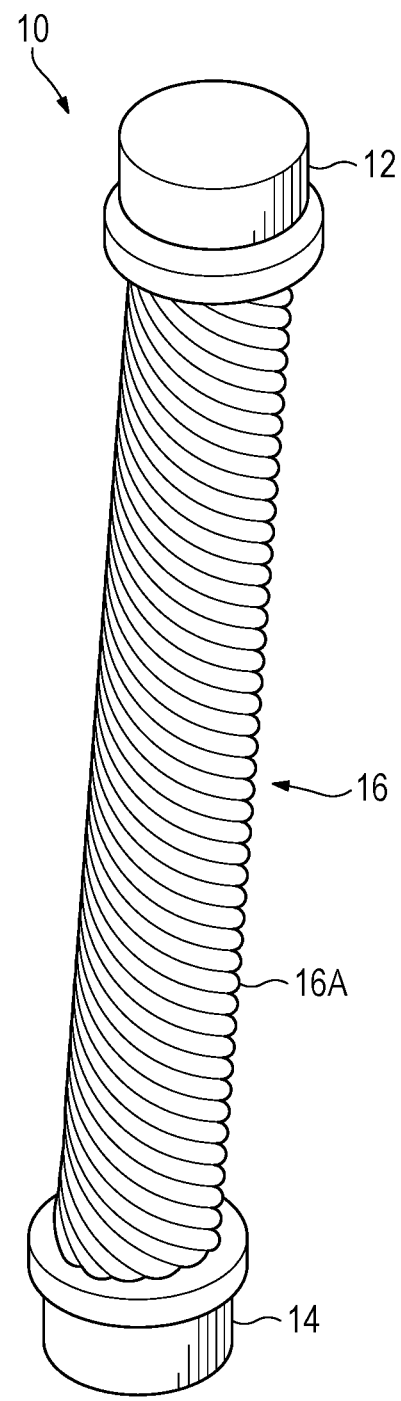
FIG. 6      FIG. 6A

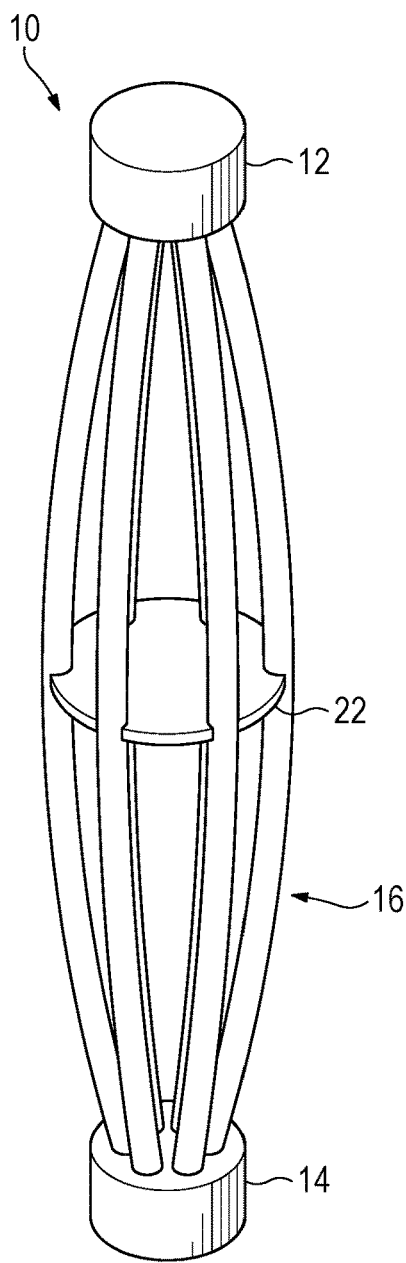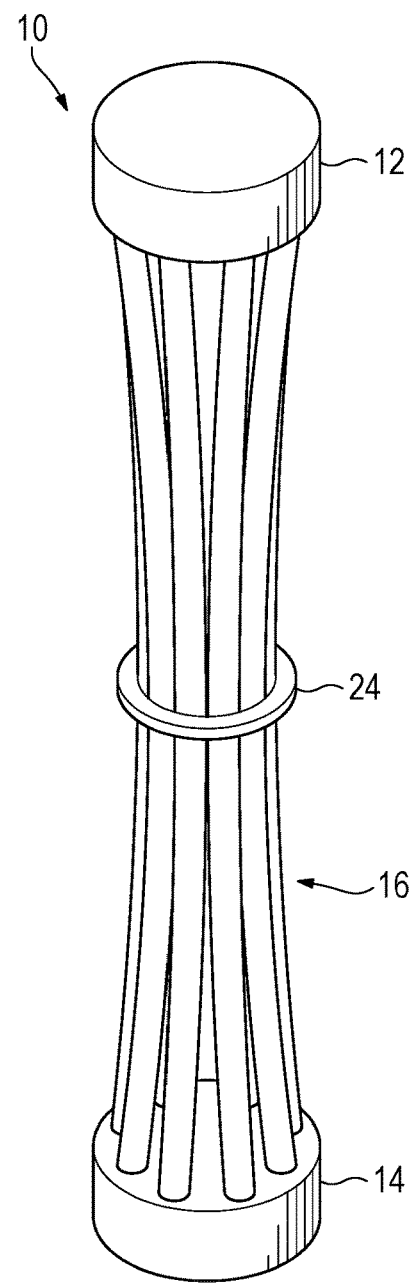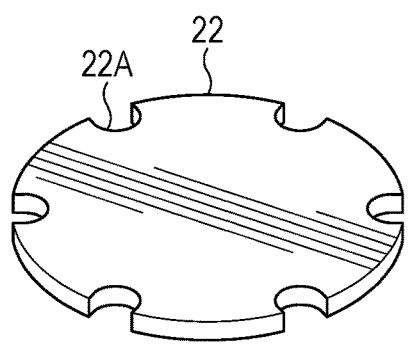
FIG. 7
FIG. 7A
FIG. 8

UNIVERSAL JOINT

FIELD OF THE INVENTION

This invention relates to universal joints for downhole drilling operations.

GENERAL BACKGROUND

Universal joints are used in mechanical applications to transmit torque between components where there can be misalignment of rotating parts. In a drilling operation, a drill bit is mounted to the end of a drill string. The drill string is rotated from the top of the string or by a motor at the bottom of the string, or both, to rotate the drill bit and advance the borehole. Universal joints are included in the drill string to accommodate rotational eccentricity. The eccentric rotation is converted into axial rotation in order for the drill bit to advance the borehole efficiently. Eccentricity can be initiated by a motor in the drive assembly that rotates the drill bit or by steering of the bit to change direction of the borehole.

FIG. 1 is a schematic representation of a drilling operation 2. In conventional drilling operations a drill bit 8 is mounted on the end of a drill string 6 comprising drill pipe and drill collars. The pipe sections of the drill string are threaded together at their ends to create a pipe of sufficient length to reach the bottom of the wellbore 4. The drill string may be several miles long. The bit is rotated in the bore either by a motor proximate to the bit or by rotating the drill string or both simultaneously. A pump circulates drilling fluid through the drill pipe and out of the drill bit, flushing rock cuttings from the bit and transporting them back up the wellbore. Additional tools and components 10 can be included in the drill string such as motors and vibrators.

The components of the drill string including the universal joint are subjected to extreme torque forces, elevated operating temperatures and abrasive drilling fluids, all of which can have an adverse effect on the operational life of drill string components. Constant relative movement of the components of a universal joint during operations, together with abrasive drilling mud, causes abrasion and erosion of mating components. Attempts have been made to effectively seal the universal joint assemblies so as to prolong their operational life. However, the constant relative movement of the components and aggressive downhole environment leads to difficulties in conventional sealing arrangements. Replacement of the joint or its components requires removal of the drill string from the borehole and downtime for the operation, which increases operational expenses substantially.

A universal joint that is less vulnerable to abrasion and erosion with an extended service life would be advantageous.

SUMMARY OF THE INVENTION

The present invention relates to a universal joint to be used as part of a downhole drill string. A joint in accordance with the invention can be inexpensive to manufacture, a single component without conventional bearing surfaces, and/or durable with limited erosion and wear susceptibility. Two terminating members are attached to each end of a cable. The cable with terminating members is flexible, and when used to connect two rotating shafts, accommodates misalignment of the shafts. In one embodiment, the joint can provide transmission of thrust as well as torque. The inventive joint can provide a compact assembly that allows the components of the drill string to be positioned closer together, which can in turn shorten the drill string.

The cable is preferably composed of a plurality of strands with each strand being thin in relation to its length. The strands are of a flexible material and the cable generally has greater stiffness than the individual strands. This configuration limits abrasion and erosion that normally occurs in conventional downhole universal joints on account of the high forces transmitted through sliding or rotating contact surfaces. A stranded cable is less subject to fretting and spalling at mating surfaces.

In one aspect of an embodiment of the present invention, a universal joint for downhole applications includes two components terminating spaced ends of a cable. The joint connects to components or tools of a drill string at each end to transmit torque and/or axial force.

In another aspect of an embodiment of the invention, a tool includes first and second cable termination members, each with a socket to terminate a cable and a connector for connecting to drill string components. With the members terminating a stranded cable, torque and/or axial forces applied at the first member of the joint is transferred to the second member.

In another aspect of an embodiment of the invention, a downhole tool assembly includes a positive displacement motor connected to a drill bit by a flexible cable that converts eccentric rotation to axial rotation to transmit torque and thrust to the bit. The cable includes first and second termination members, each with a socket to receive the cable at one end and a connector at the opposite end.

In another aspect of the invention, a service life indicator is visible on the cable providing a gauge of wear, erosion, overstress and/or fatigue. The indicator can include strands of limited dimension or contrasting material properties in relation to adjacent strands incorporated in the cable. In another aspect of the invention, the cable is used in conjunction with a positive displacement motor or a rotational impulse tool. In another aspect of the invention, a universal joint includes a coiled wire about a hollow core. In another aspect of the invention, a universal joint includes a coiled wire about a solid core. In another aspect of the invention the tool is a flaccid component to transfer torque and axial force.

BRIEF DESCRIPTION OF THE DRAWINGS

FIG. 6 is a cross section view of a third embodiment of the invention.

FIG. 6A is a perspective view of the third embodiment.

FIG. 7 is a perspective view of a fourth embodiment of the invention.

FIG. 7A is a perspective view of a separation disk of the fourth embodiment.

FIG. 8 is a perspective view of a fifth embodiment of the invention.

DETAILED DESCRIPTION OF THE PREFERRED EMBODIMENTS

Figure 1:
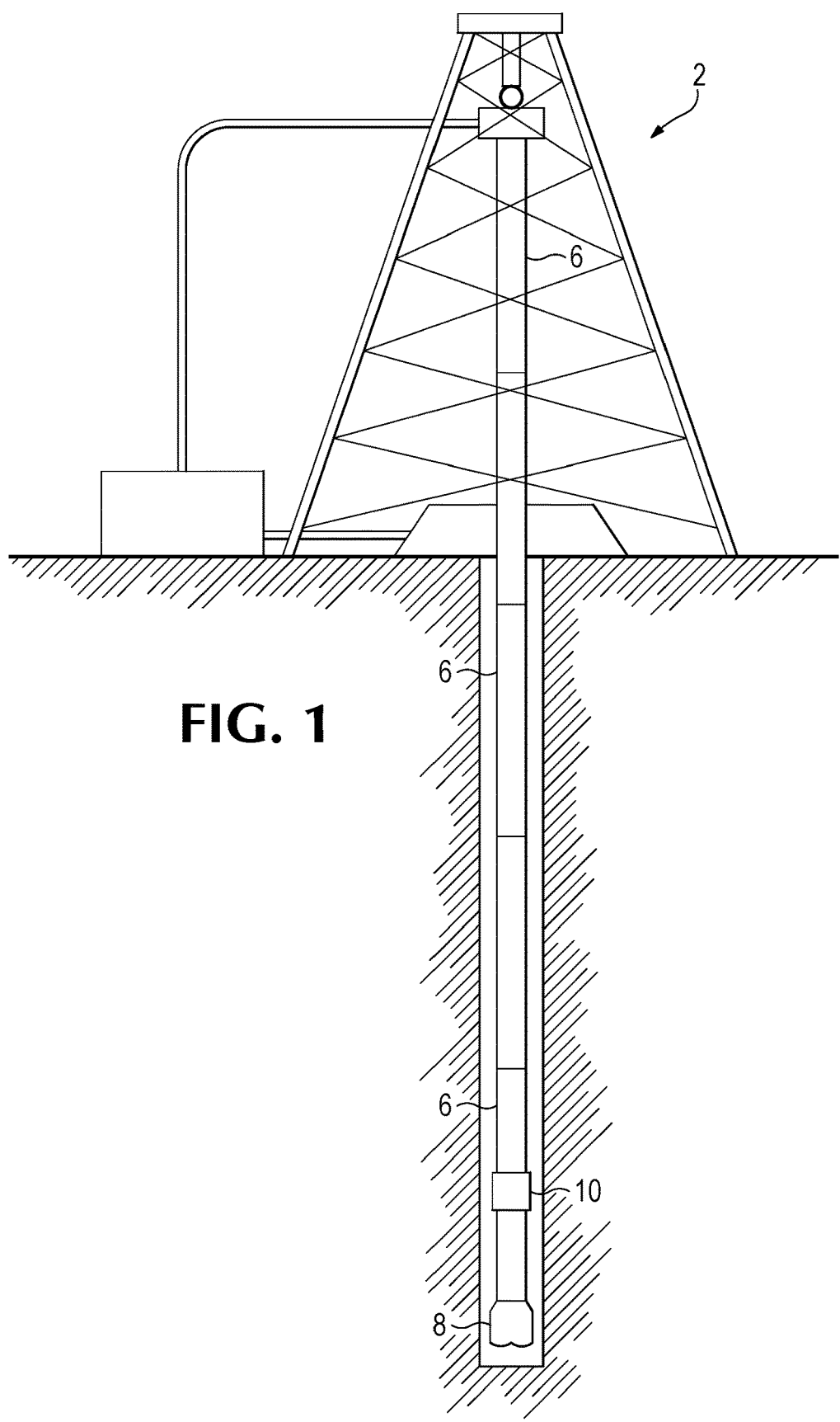
FIG. 1 is a schematic diagram of a drilling operation.

A drill string in its basic form consists of sections of threaded pipe and tools assembled end to end with a drill bit at a distal end for advancing a borehole. The drill string can be miles long and rotated at a proximal end of the pipe by a drilling rig (or otherwise) to turn the drill bit and advance the borehole. There are many different kinds of supplemental components that can be assembled to the drill string to perform a range of functions such as reaming out obstructions from the borehole, widening the borehole or vibrating to limit friction between the string and the borehole.

Positive displacement or mud motors can be installed at the distal end of the drill string to drive the drill bit instead of, or in addition to, driving the drill string from the above ground drill rig. Fluid is pumped down the drill string during operation under pressure to flush material out of the borehole. A mud motor uses the pressure of the fluid to drive a rotor in a stator housing. The output of the motor is eccentric, with the rotor shaft rotating about a circle as well as rotating about its axis. In order to limit the stress on the drill string and bit, one or more universal joints are installed as part of the drill string. The universal joint transmits the torque to the drill bit and converts the eccentric rotational component to axial rotation.

The disclosed universal joint 10 includes a pair of cable termination or end members 12, 14. End member 12 has a connector 12A at one end for joining to a drill string or drill string components. The other end of the termination member 12 is a receiving structure such as a cup or cavity 12B to receive the end of a cable 16. End member 14 has a corresponding construction with a connector 14A at one end and a receiving structure such as a cup or cavity 14B at the other end to receive the other end of cable 16. End members 12 and 14 are shown as having the same configuration, but they could have different constructions. Other configurations of top and bottom terminating members than those shown are possible.

Figure 2:
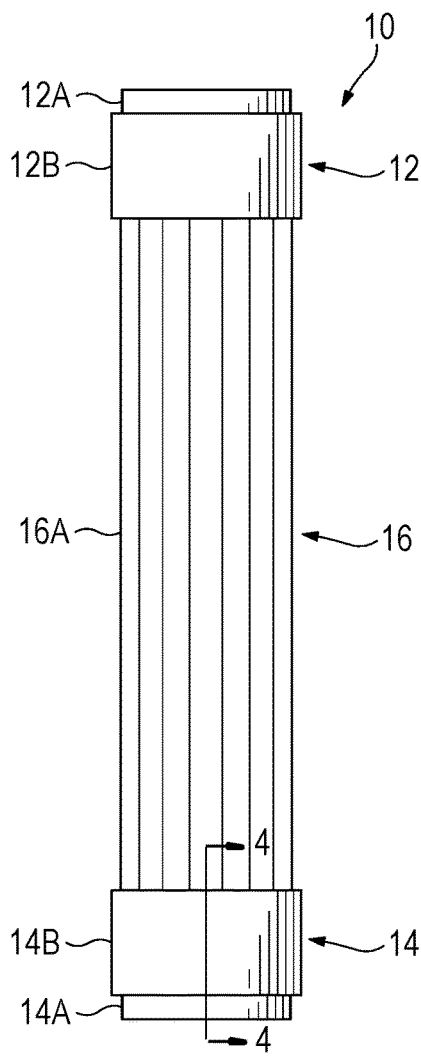
FIG. 2 is a side view of an embodiment of the inventive universal joint.
Figure 3:
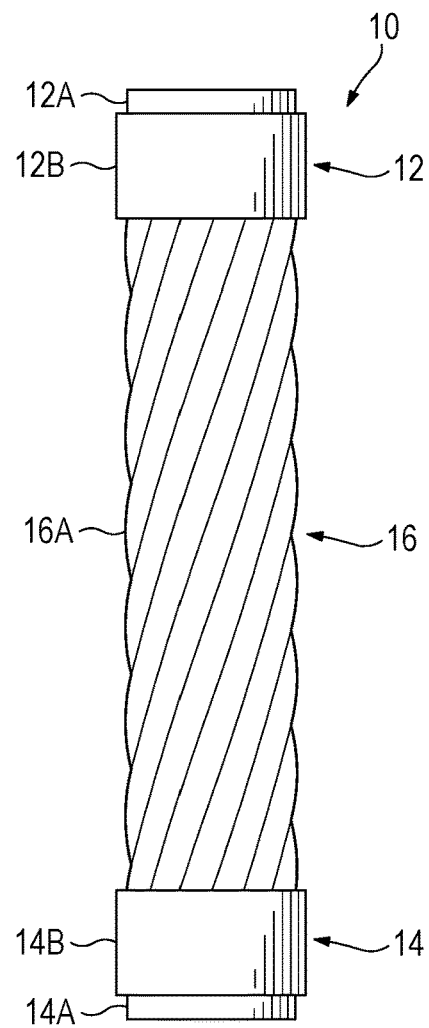
FIG. 3 is a side view of a second embodiment of the invention.

Cable 16 preferably includes one or more strands 16A. The strands 16A of cable 16 can be parallel (FIG. 2) or can be braided (FIG. 3). There are many braiding techniques and strand lay configurations that are well understood by those skilled in the art. The strands of the cable can be embedded in a matrix but need not be. The strands can be covered by a sleeve that holds some or all of the strands. Cable 16 can include coiled wires consisting of a single strand wound around a hollow core.

In an alternative embodiment, cable 16 is a coiled wire consisting of a single strand 16A wound around a core material 16B as shown in FIG. 6. The core material can extend between the upstream and downstream terminating members 12, 14. The core material can be received in the terminating members with the coiled wire and can transmit an axial load between the upstream and downstream terminating members. Alternatively, the core material can be seated in the terminating members at bearing surfaces 12B and 14B. The core material can transmit an axial load through the bearing surface and the end can rotate against the bearing surface as the cable deflects in operation. Alternatively, the core material can end before the terminating member. As an example the core material can be rubber, but other materials are possible.

In an alternative embodiment, the cable is a flexible line to transfer torque between components. The flexible line can be a series of links or other structure.

End members 12 and 14 are terminal fittings for cable 16. Methods for connecting a terminal fitting to a cable are well known by those skilled in the art. Methods include inserting a wedge between the end strands of the cable and sliding a tapered sheath over the outside of the wire to compress the wire and wedge. Alternatively, terminal fittings can be swaged to the cable. Alternatively, a termination fitting with a cup can receive the end of a metal cable, and molten metal poured in the cup to bond the metal cable to the cup surface and retain the cable in the cup. Cables that comprise polymer or natural fiber strands can be infiltrated with epoxy in a terminal fitting. Other methods used to terminate the cable are possible. End member connectors can include a threaded coupling, ferrule, eye, thimble or any similar fitting that allows connection of the cable to other tools or components in the drill string.

The material(s) for individual strands are selected to allow the cable to deflect and/or flex to accommodate the eccentric rotation. In a downhole drilling operation, the upstream termination member 12 generally rotates about an upstream axis LA1 while the downstream termination member 14 generally rotates about a downstream axis LA2. While neither turning may be a perfect rotation about an axis, the upstream end member typically tends to have a greater offset so as to also generally orbit about upstream axis LA1. The upstream end member 12 can deflect or translate transversely to be offset from the downstream end member. The upstream axis LA1 may be parallel to or inclined to the downstream axis LA2.

When the upstream axis LA1 is inclined to the downstream axis LA2, rotation can be measured as the angular deflection "$\beta$" of the longitudinal axis LA1 of the upper member in relation to the longitudinal axis LA2 of the lower member. Transverse deflection of the upper member 12 can be measured as a distance R. The upper member would, then, rotate or orbit in relation to the lower axis LA2 making an angular deflection "$\Phi$" about the axis LA2 at a distance R. This orbit can also be eccentric with LA2 not being the center of the orbit through angle $\Phi$. In a typical application where the joint 10 connects two misaligned pieces of machinery with rotating portions, the angle $\beta$ can be constant while the angle $\Phi$ sweeps zero to 360 degrees.

Where the cable strands are braided, torque and axial forces applied to the cable can result in a complex combination of forces in the individual strands. An individual strand can be in tension in one section of the cable and in compression in an adjacent section. The lay of the braid can be selected to optimize the function of the cable in a specific application such as maintaining stiffness of the cable under a specific torque and/or thrust. The overall axial forces can be one of pulling or pushing depending on the location of the universal joint in the drill string and/or operation of the drill string.

The cable can flex in complex ways in response to applied torque and axial forces. For example, the cable can form a sinusoidal curve or take the shape of a conical helix. The overall axial stiffness of the cable can increase with the twisting and the cable can more efficiently transmit thrust through the cable.

In transmitting torque, the upstream end member 12 and the downstream end member 14 rotate about their respective axes. On application of torque at the upstream end member 12, the upstream end member begins to rotate. The strands 16A of cable 16 deflect in response to the stress of the torque putting the strands in tension or compression depending on the lay of the cable. The cable winds taking up torque as stored energy in the strands. As the cable strands deflect, torque is transmitted to the downstream end member 14. Torque transferred to the downstream end member 14 rotates the downstream end member about its axis LA2 and any tools attached to the downstream end member.

Material used for the cable strands is matched to the expected flexural, torque and axial thrust forces expected in the application. The cable material can be one or more material selected from the group of metals, synthetic fibers or natural fibers and can include steel, copper alloys, Kevlar®, nylon, stainless steel, polymers or other materials. Cable 16 can include strands of different materials with contrasting material properties. The material properties of the strands can vary along their length to optimize properties of the cable. For example, the strands can be thicker at the ends or can be stiffer at the end portions than in the middle portion of the cable. Alternatively, the strands can taper extending from one end to the other end so the cable is thicker at one end.

The universal joint in operation is typically part of an assembly inside an outer casing of the drill string with other components such as the mud motor. In some embodiments, the assembly may be extracted from the inside of the drill string and brought to the surface as a separate unit.

The cable 16 of universal joint 10 can include a service life indicator 18 (SLI) that displays a gauge of remaining service life for the component. The indicator can allow the operator to replace the universal joint before a downhole failure. Materials repeatedly flexed are subject to fatigue failure from hardening, or other material degradation such as embrittlement, and can fracture. In one embodiment the service life indicator is a fatigue indicator. The fatigue indicator can be a strand 18A integrated with strands 16A of the cable 16 that flexes with the cable in service. The fatigue indicator strand 18A has a configuration or is a material selected to be more vulnerable to fatigue stress than the balance of the strands.

For example, the fatigue indicator strand can be selected to have a service life of 80% of the life of other strands or the cable as a whole. Reduced service life of the fatigue indicator may be a factor of the dimensions of the indicator, accelerated work hardening of the material and/or a harder material as compared to the balance of the strands of the cable. At 80% of the service life, the wear indicator develops visible failure mechanisms such as thinning, cracking or other visible indicia that can be detected by the operator. The universal joint or the cable can be removed from service before the cable fails in response to visual inspection of the fatigue indicator.

Figure 4:
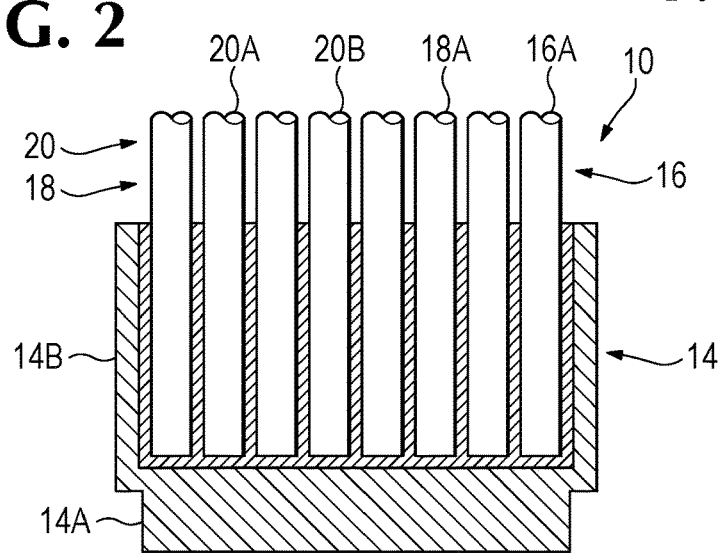
FIG. 4 is a cross section view taken along line 4-4 in FIG. 2.
Figure 5:
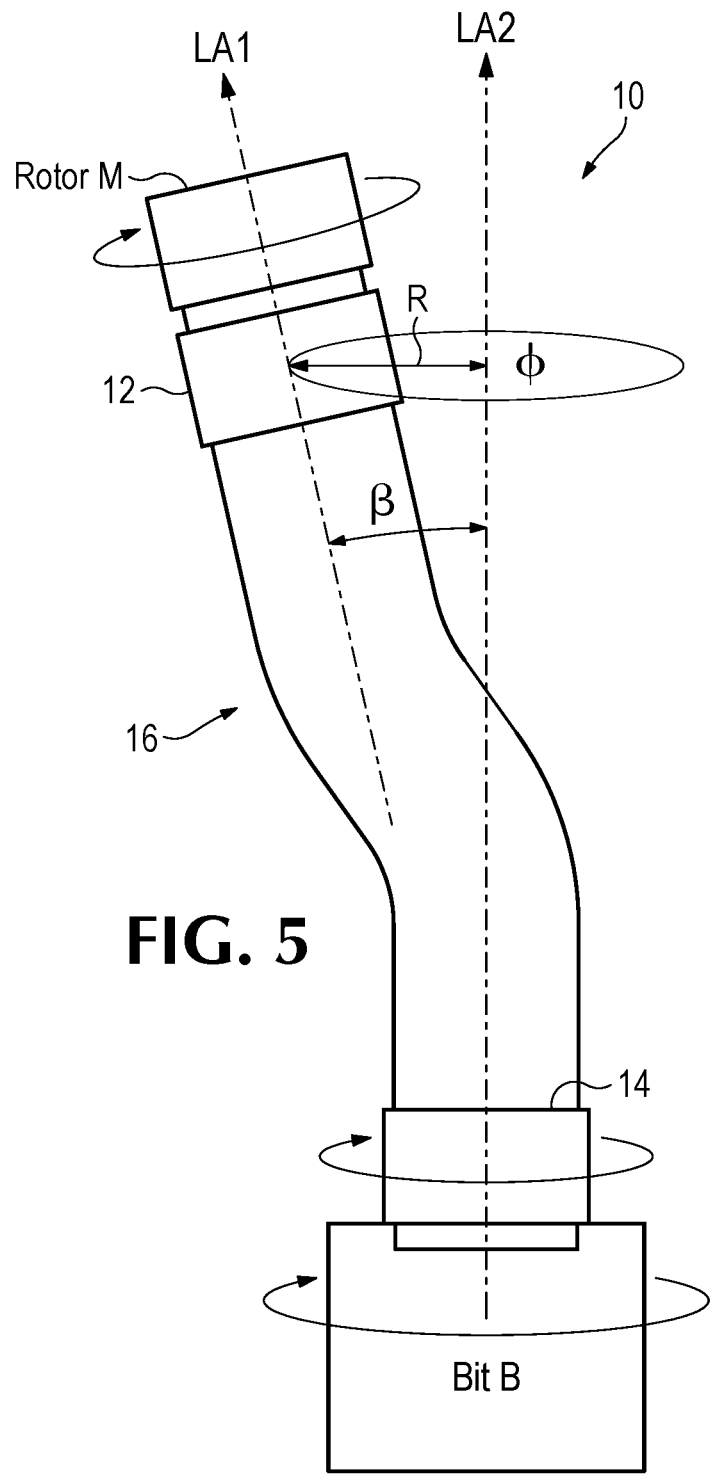
FIG. 5 is a schematic view of an inventive universal joint in a downhole tool assembly connecting a motor to a bit in a drill string.

Components of a drill string are in contact with suspended particles of the drilling fluid that are abrasive and erode the components. Flexure of the cable can result in the adjacent strands cyclically sliding against each other. Particles between the strands abrade and erode the adjacent surfaces. In one embodiment, the service life indicator 18 is a wear or erosion indicator. The wear indicator can include a strand 18A in the cable stack that is thinner than adjacent strands (FIG. 4). Erosion of the strand 18A to a critical thickness can be visually detected by the operator. Alternatively, in another example, the erosion indicator can be a similar thickness to adjacent strands but of a material that erodes at a higher rate than adjacent strands.

In downhole applications, the forces experienced by the universal joint may exceed predicted ranges which can limit the service life. For example, where the drill string experiences stick slip conditions the bit can seize in the borehole such that torque builds up in the drill string subjecting the joint to excess torque. Early failure of the component due to excessive torque can require unplanned extraction of the drill string from the hole incurring substantial expense.

The cable 16 of universal joint 10 can include an overstress indicator 21. In one embodiment of an overstress indicator, cable 16 includes strands 20A and 20B. These strands may fail at a lower applied stress level than adjacent strands. If in operation the joint experiences torque above the specified torque, one or both strands break. One or both strands breaking can indicate the magnitude of excess torque.

A service life indicator may incorporate several types of failure mechanism indicators in a single component. The service life indicator may be distinguished from other portions of the cable by color or may be spaced from adjacent components. In some embodiments the service life indicator is inspected with a visual magnification, specific illumination such as ultraviolet light, ultrasonic testing, penetrant dye testing or other inspection methods. In some embodiments the service life indicator is a sensor that generates an electronic signal.

The universal joint 10 can include a component that displaces or constrains strands transversely. The universal joint may include a disk that separates one or more strand 16A so cable 16 comprises individual or groups of strands. As shown, the strands are discrete and separated. This embodiment could alternatively comprise a plurality of separated cables. FIG. 7 shows a disk 22 separating strands of the cable. FIG. 7A shows disk 22 with insets 22A. Strands can be received into the insets. Alternatively, the cable strands could be separated into groups by one or more sleeves around groups of strands. A cable comprising transversely offset groups can have improved properties for transferring torque and axial force. Although six groups of strands are shown as an example, the cable can comprise two, three, five or more groups of strands. Disk 22 can take on other shapes as well including triangles, stars or polygons. Disk 22 can include one or more holes that receive strands.

FIG. 8 shows a cable 16 with a band 24 around the cable. The band can constrain or compress the cable transversely. Compressing the cable can increase friction between strands of the cable. Compressing some or all of the bands transversely can improve properties for transferring torque and axial force.

The universal joint disclosed above is inexpensive to manufacture, is a single component without bearing surfaces, and is durable with limited erosion and wear susceptibility. The joint can include service life indicators that allow the operator to replace the unit before operational failure.

It should be appreciated that although selected embodiments of the representative universal joints are disclosed herein, numerous variations of these embodiments may be envisioned by one of ordinary skill that do not deviate from the scope of the present disclosure. The disclosure set forth herein encompasses multiple distinct inventions with independent utility. The various features of the invention described above are preferably included in each universal joint. Nevertheless, the features can be used individually in a joint to obtain some benefits of the invention. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed.

The invention claimed is:

1. A universal joint for downhole applications including:
   a stranded cable with spaced ends;
   a first component fixed to and terminating a first end of the cable, and including a connector for coupling with a shaft of a positive displacement motor; and a second component fixed to and terminating a second end of the cable, and including a connector for connecting into a downhole tool;

wherein the cable transmits torque and axial force from the first component to the second component;

wherein the cable comprises strands that extend continuously in a lateral direction and a disk that laterally spaces strands from each other.

2. The universal joint of claim 1 where the cable includes two kinds of strand material with contrasting material properties.

3. The universal joint of claim 1 where the cable includes a solid portion at least half the diameter of the cable.

4. The universal joint of claim 1 where the cable includes a service life indicator providing a visible indication of wear, erosion, overstress and/or fatigue.

5. The universal joint of claim 4 where the service life indicator is a distinct strand of the cable, distinguishable from other strands of the cable by appearance, composition, or position.

6. The universal joint of claim 1 where the cable includes a hollow tube.

7. The universal joint of claim 1, wherein the strands are parallel or braided.

8. The universal joint of claim 1, wherein the disk comprises insets for receiving the strands.

9. The universal joint of claim 1, wherein the disk is disposed between the first end and the second end.

* * * * *